United States Patent
Aubourg

(10) Patent No.: US 7,225,062 B2
(45) Date of Patent: May 29, 2007

(54) DEVICE FOR INDICATING THE VIBRATION LEVEL OF A VEHICLE

(75) Inventor: Pierre-Antoine Aubourg, Marseille (FR)

(73) Assignee: Eurocopter, Marignane Cedex (FR)

( * ) Notice: Subject to any disclaimer, the term of this patent is extended or adjusted under 35 U.S.C. 154(b) by 71 days.

(21) Appl. No.: 11/017,909

(22) Filed: Dec. 22, 2004

(65) Prior Publication Data

US 2006/0064210 A1 Mar. 23, 2006

(30) Foreign Application Priority Data

Dec. 22, 2003 (FR) .................................. 03 15152

(51) Int. Cl.
*G01C 1/00* (2006.01)
*B64C 23/00* (2006.01)

(52) U.S. Cl. .......................... 701/3; 701/13; 244/158.1
(58) Field of Classification Search ................ 701/1, 701/3, 13; 244/158.1
See application file for complete search history.

(56) References Cited

U.S. PATENT DOCUMENTS

| | | | |
|---|---|---|---|
| 3,747,703 A | 7/1973 | Knowd et al. | |
| 3,758,758 A | 9/1973 | Games et al. | |
| 3,945,256 A * | 3/1976 | Wilson et al. | ............... 73/455 |
| 6,026,348 A | 2/2000 | Hala | |
| 6,229,898 B1 * | 5/2001 | Goodman | ............... 381/71.4 |
| 6,427,815 B1 * | 8/2002 | Zeller | ............... 188/380 |
| 6,728,658 B1 | 4/2004 | Bechhoefer | |

FOREIGN PATENT DOCUMENTS

DE     101 33 987     2/2003

\* cited by examiner

*Primary Examiner*—Gertrude A. Jeanglaude
(74) *Attorney, Agent, or Firm*—Young & Thompson

(57) ABSTRACT

A device for indicating at least a first vibration level VIB1 derived from a first acceleration signal γ1 includes:

first analysis element FT1 for resolving the first acceleration signal γ1 into a plurality of axial analysis signals $\gamma 1_i$ each occupying an identified frequency band $B_i$;

a first memory RM1 having recorded therein a plurality of axial weighting coefficients $KA_i$, each corresponding to one of the identified frequency bands $B_i$; and a first control circuit CC for summing the $p^{th}$ powers of the axial analysis signals $\gamma 1_i$ weighted by the axial weighting coefficients $KA_i$, thereby producing the first vibration level VIB1.

14 Claims, 2 Drawing Sheets

DEVICE FOR INDICATING THE VIBRATION LEVEL OF A VEHICLE

The present invention relates to a device for indicating the vibration level of a vehicle.

BACKGROUND OF THE INVENTION

The field of the invention is that of analyzing vibration, and more particularly vibration in an appliance that is provided with an engine driving a rotary propulsion member. A typical example of an application of the invention is a helicopter, a vehicle which presents a high level of vibration that is due essentially to the main rotor serving to support the helicopter and to enable it to move.

It is important to characterize the vibration present in such a vehicle since vibration is a sign of stresses that can lead to a fatigue phenomenon and that therefore have a direct influence on safety. Vibration can also degrade the performance of various items of equipment installed on the vehicle. In addition, vibration in a helicopter cabin is instrumental in determining passenger and pilot comfort. It goes without saying that pilot comfort is also an essential feature for safety.

Thus, a system is known for continuously recording vibration within a helicopter, which system is known as a health usage monitoring system (HUMS). The system records a warning in a removable monitoring cartridge if the level of vibration exceeds a predetermined threshold at a frequency $\Omega$, $2\Omega$, or $B\Omega$, where $\Omega$ represents the speed of rotation of the rotor and B the number of blades mounted on the rotor. The warning can be detected only in a ground station equipped to play back the information recorded in the cartridge. The pilot does not have access to this information while on a mission. In addition, no means is provided to give an overall assessment of the vibration level that is not restricted to an identified frequency, but rather reflects the overall behavior of the vehicle.

OBJECTS AND SUMMARY OF THE INVENTION

An object of the present invention is thus to provide a device which indicates the vibration level of a vehicle, preferably in real time, and over a broad range of frequencies, by means of a single data item.

According to the invention, the device indicates at least a first vibration level derived from a first acceleration signal, and it comprises:

first analysis means for resolving the first acceleration signal into a plurality of axial analysis signals each occupying an identified frequency band;

a first memory in which a plurality of axial weighting coefficients are stored, each corresponding to one of said identified frequency bands; and a first control circuit for summing the $p^{th}$ powers of the axial analysis signal weighted by the axial weighting coefficients, thereby producing the first vibration level.

In addition, the device includes a first comparator for producing a first alert signal when the first vibration level exceeds a first predetermined threshold.

In addition, the device includes a first concentrator member arranged so that the plurality of axial analysis signals come from a plurality of measurement signals, each coming from a distinct sensor.

In a first option, the first concentrator member sums the measurement signals.

In a second option, the first concentrator member retains the greatest of said measurement signals.

Preferably, the device receives a second acceleration signal and comprises:

second analysis means for resolving the second acceleration signal into a plurality of radial analysis signals, each contained in an identified frequency band;

a second memory having a plurality of radial weighting coefficients recorded therein, each corresponding to one of said identified frequency bands; and a second control circuit CC for summing the $p^{th}$ powers of the radial analysis signals weighted by the radial weighting coefficients in order to produce a second vibration level.

In addition, the device includes a second comparator for producing a second alert signal when the second vibration level exceeds a second predetermined threshold.

In addition, the device further includes a second concentrator member arranged so that the plurality of radial analysis signals come from a plurality of evaluation signals, each coming from a distinct sensor.

In a first embodiment, the second concentrator member sums said evaluation signals.

In a second embodiment, the second concentrator member retains the greatest of said evaluation signals.

Advantageously, the device includes a combiner member for producing a warning signal when a combination of the two alert signals exceeds a third predetermined threshold.

By way of example, the combiner member sums the $q^{th}$ powers of the alert signal, the value of q preferably being equal to 1.

BRIEF DESCRIPTION OF THE DRAWINGS

The present invention appears below in greater detail in the following description of embodiments given by way of illustration and with reference to the accompanying figures, in which.

Elements that are shown in more than one figure are given the same references in all of them.

MORE DETAILED DESCRIPTION

Figure 1:
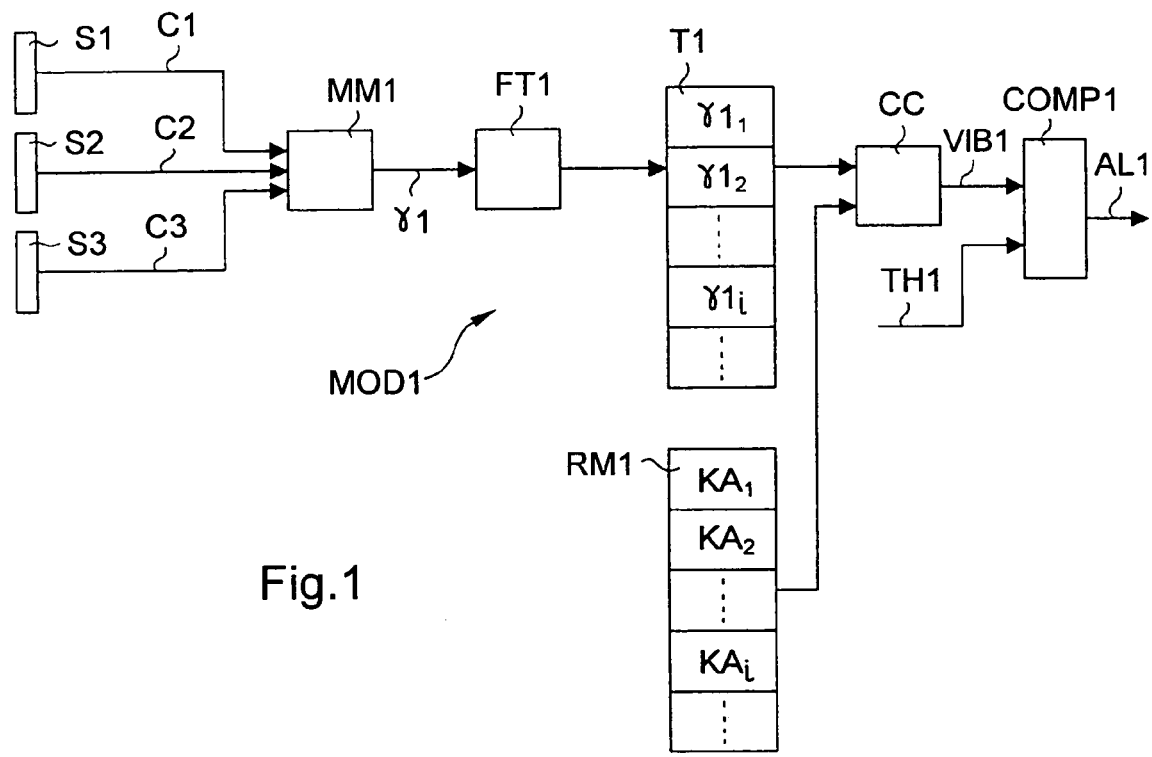
FIG. 1 shows an analysis module of the invention.

With reference to FIG. 1, a first analysis module MOD1 comprises first, second, and third sensors S1, S2, and S3, disposed in the cabin of a helicopter to measure axial vibration, i.e. vibration directed along the axis of the rotor. Each of the three sensors delivers a respective first, second, or third measurement signal C1, C2, or C3 which represents the axial acceleration to which the sensor is subject. The sensors are preferably accelerometers or strain gauges.

A first concentrator member MM1 receives the three measurement signals C1, C2, and C3 and combines them to form a first acceleration signal γ1. In a first option, it sums the measurement signals.

In a second option, it reproduces the greatest measurement signal as the first acceleration signal.

It should be observed that the invention also applies when only one sensor is provided, in which case it delivers the first acceleration signal γ1 directly and the first concentrator member MM1 is omitted.

First analysis means FT1 transposes the first acceleration signal γ1 from the time domain into the frequency domain; in other words, the means FT1 performs the discrete Fourrier transform on the signal. Thus, in a first table T1, it produces a plurality of axial analysis signals $\gamma 1_1, \gamma 1_2, \ldots, \gamma 1_i, \ldots, \gamma 1_n$, giving the value for acceleration in successive narrow frequency bands, where the union of said bands defines the frequency domain of the analysis.

A first memory RM1 contains axial weighting coefficients $KA_1, KA_2, \ldots, KA_i, \ldots, KA_n$ which correspond to the various frequency bands identified by the first analysis means FT1. These coefficients represent the relative importance of a frequency band in the general level of vibration of the cabin.

It will be understood that some kinds of vibration are much more harmful than others. Thus, if it is desired to monitor the balance of the helicopter rotor, frequencies that are multiples of the speed of rotation are particularly symptomatic. In contrast, if it is desired to pay attention more particularly to comfort, reference may advantageously be made to the standard ISO 2631 which, for a given duration of exposure, defines the maximum levels of vibration that are acceptable as a function of frequency.

Figure 2:
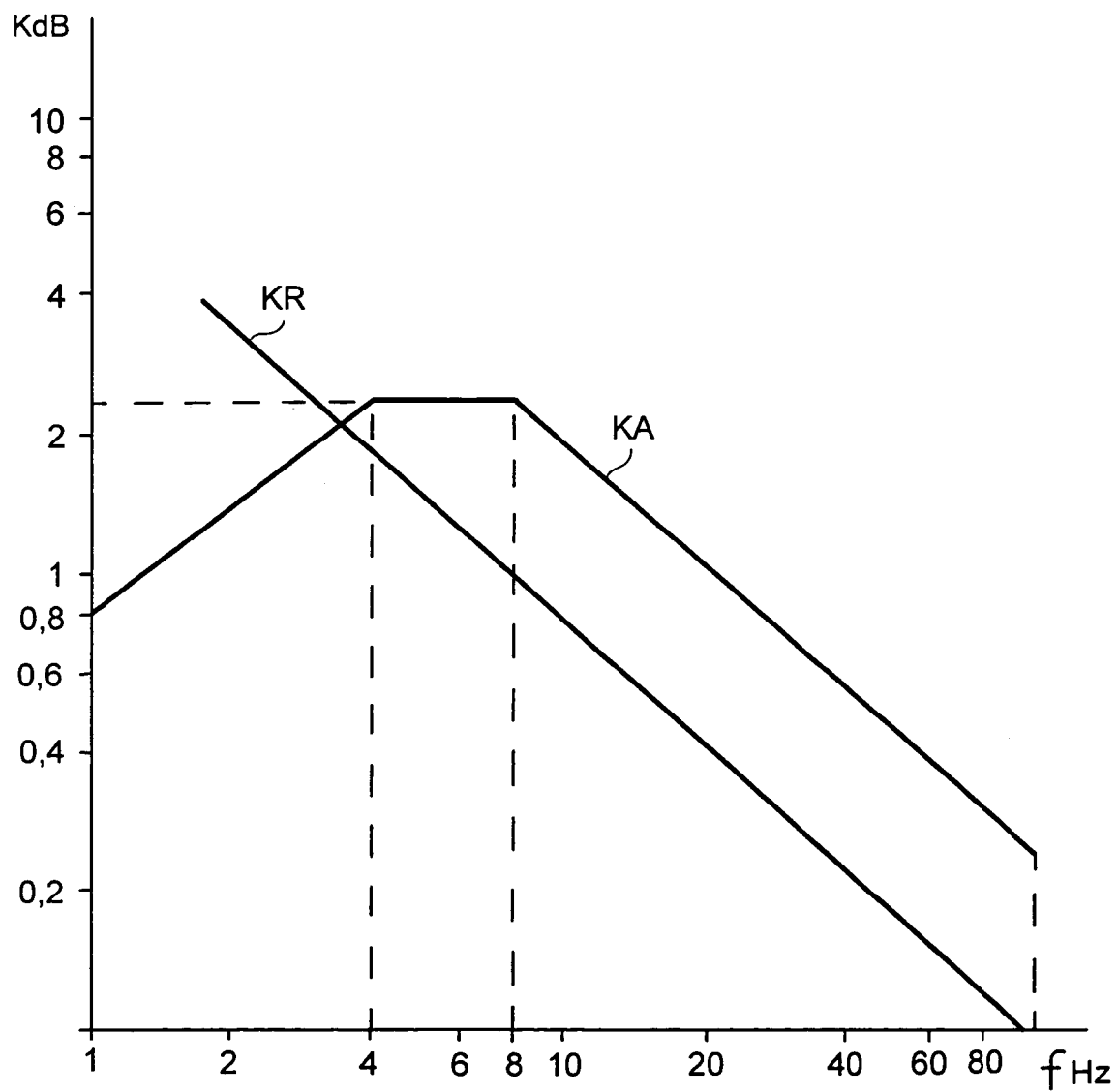
FIG. 2 is a graphical representation of the axial and radial coefficients.

With reference to FIG. 2, simple means for defining the axial weighting coefficient KA consist, for a given frequency (or frequency band) in subtracting from an arbitrary constant the value corresponding to the maximum level along the vertical axis or z axis as specified in that standard. Thus, in logarithmic coordinates, the representation of KA as a function of frequency approximates to a straight line of rising slope in the range 1 hertz (Hz) to 4 Hz, followed by a level portion in the range 4 Hz to 8 Hz, and terminated by a straight line of falling slope in the range 8 Hz to 100 Hz.

A first control circuit CC produces a first vibration level VIB1 by summing the $p^{th}$ powers of the axial analysis signals $\gamma 1_i$ weighted by the axial weighting coefficients $KA_i$:

$$VIB1 = \sum_{i=1}^{n} KA_i \cdot (\gamma 1_i)^p$$

Advantageously, p is equal to 2.

A first comparator COMP1 produces a first alert signal AL1 if the first vibration level VIB1 exceeds a first predetermined threshold TH1.

Preferably, the device has a second analysis module MOD2 for producing a second vibration level VIB2 and a second warning alert AL2. The second module is not shown in detail in the drawings, since it is analogous (in particular identical) to the first analysis module.

The second analysis module MOD2 has fourth, fifth, and sixth sensors disposed in the cabin to measure vibration that is radial, i.e. perpendicular to the axis of the rotor. These three sensors deliver respective first, second, and third evaluation signals C1, C2, and C3 representative of the radial acceleration to which the respective sensors are subject.

A second concentrator member receives the three evaluation signals for the purpose of combining them (in application of a function) to produce a second acceleration signal; this member preferably either sums the evaluation signals or else retains the greatest one of them.

Second analysis means transposes the second acceleration signal from the time domain into the frequency domain. This thus produces a second table comprising a plurality of radial analysis signals.

A second memory contains radial weighting coefficients $KR_1, KR_2, \ldots, KR_i, \ldots, KR_n$ which corresponds to different frequency bands identified by the second analysis means.

With reference to FIG. 2, a simple means for defining the radial weighting coefficients KR consists, for a given frequency (or frequency band), in subtracting from an arbitrary constant the value that corresponds to the maximum level along the x or y axis, i.e. in a horizontal plane. Thus, in logarithmic coordinates, the representation of KR as a function of frequency approximates to a straight line of slope that falls from 1 Hz to 100 Hz.

A second control circuit produces a second vibration level by summing the $p^{th}$ powers of the radial analysis signals weighted by the radial weighting coefficients. Preferably, this circuit sums the second powers (p=2) of the weighted signals.

A second comparator produces a second alert signal AL2 if the second vibration level exceeds a second predetermined threshold.

Figure 3:
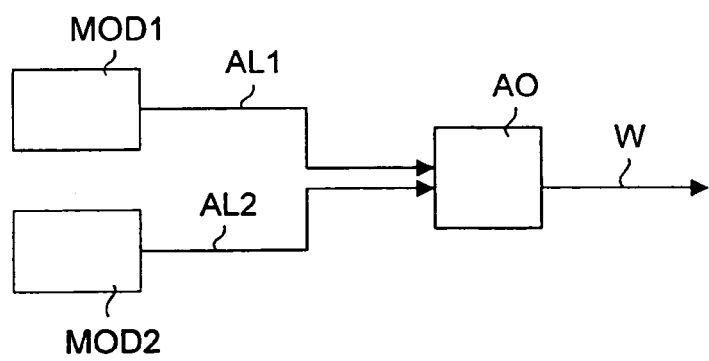
FIG. 3 is a block diagram of a device of the invention.

With reference to FIG. 3, the device of the invention thus comprises the first and second analysis modules MOD1 and MOD2 together with a combiner member AO. This member produces a warning signal W when any combination of the alert signals AL1, AL2 exceeds a third predetermined threshold. Preferably, this combination is the sum of the $q^{th}$ powers of the two alert signals, where a simple solution consists in giving q the value 1.

Naturally, the present invention is subject to numerous variations concerning its implementation. Although several embodiments are described, it will readily be understood that it is not possible to identify exhaustively all possible embodiments. Naturally, it is possible to envisage replacing any of the means described by equivalent means without going beyond the ambit of the present invention.

What is claimed is:

1. A device for indicating the vibration level of a helicopter including a rotor, in order to produce first and second vibration levels derived from respective first and second acceleration signals, the device comprising:
    first analysis means for resolving said first acceleration signal delivered by one or more sensors measuring vibration directed along the axis of the rotor into a plurality of axial analysis signals, each occupying a respective first identified frequency band;
    a first memory having recorded therein a plurality of axial weighting coefficients, each corresponding to one of said first identified frequency bands;
    a control circuit summing second powers of said axial analysis signals weighted by said axial weighting coefficients, thereby producing said first vibration level,
    second analysis means for resolving said second acceleration signal into a plurality of radial analysis signals, each occupying a respective second identified frequency band, said second acceleration signal being delivered by one or more sensors measuring vibration directed perpendicularly to the axis of the rotor;
    a second memory recording a plurality of radial weighting coefficients, each corresponding to one of said second identified frequency bands; and
    a second control circuit summing second powers of said radial analysis signals weighted by said radial weighting coefficients in order to produce said second vibration level.

2. A device according to claim 1, including a first comparator for producing a first alert signal when said first vibration level exceeds a first predetermined threshold.

3. A device according to claim 2, including a second comparator for producing a second alert signal when said second vibration level exceeds a second predetermined threshold.

4. A device according to claim 3, including a combiner member for producing a warning signal when a combination of said alert signals exceeds a third predetermined threshold.

5. A device according to claim 4, wherein said combiner member sums the $q^{th}$ powers of said alert signals.

6. A device according to claim 5, wherein the value of q is equal to 1.

7. A device according to claim 1, further comprising a first concentrator member arranged so that said plurality of axial analysis signals come from a plurality of measurement signals each coming from a distinct sensor.

8. A device according to claim 7, wherein said first concentrator member sums said measurement signals.

9. A device according to claim 7, wherein said first concentrator member retains the greatest of said measurement signals.

10. A device according to claim 7, including a second concentrator member arranged so that said plurality of radial analysis signals come from a plurality of evaluation signals, each coming from a distinct sensor.

11. A device according to claim 10, wherein said second concentrator member sums said evaluation signals.

12. A device according to claim 10, wherein said second concentrator member retains the greatest of said evaluation signals.

13. A device for indicating vibration levels of a helicopter rotor, comprising:
   one or more first sensors measuring vibration along an axis of the rotor and delivering a first acceleration signal;
   first analysis menas for performing a discrete Fourier transform on said first acceleration signal and producing a plurality of axial analysis signals giving values of axial acceleration in succesive narrow frequency bands;
   a first memory storing plural axial weighting coefficients, each corresponding to a respective one of the successive narrow frequency bands;
   a first control circuit summing second powers of the axial analysis signals weighted by the respective axial weighting coefficients to provide a first vibration level;
   one or more second sensors measuring vibration perpendicular to the axis of the rotor and dilivering a second acceleration signal;
   second analysis means for performing a discrete Fourier transform on said second acceleration signal and producing a plurality of radial analysis signals giving values of radial acceleration in the successive narrow frequency bands;
   a second memory storing plural radial weighting coeffeicients, each corresponding to a respective one of the succesive narrow frequency bands;
   a second control circuit summing second powers of the radial analysis signals weighted by the respective radial weighting coefficients to provide a second vibration level.

14. The device according to claim 13, further comprising a comparator for producing an alert signal when one of the first and second vibration levels exceeds a threshold.

* * * * *